Nov. 13, 1934.  A. S. FITZ GERALD  1,980,395
ELECTRORESPONSIVE SYSTEM
Filed Oct. 3, 1931  4 Sheets-Sheet 1

INVENTOR
Alan S. Fitz Gerald

INVENTOR
Alan S. Fitz Gerald

Patented Nov. 13, 1934

1,980,395

UNITED STATES PATENT OFFICE 1,980,395

ELECTRORESPONSIVE SYSTEM

Alan S. Fitz Gerald, Wynnewood, Pa.

Application October 3, 1931, Serial No. 566,657

30 Claims. (Cl. 175—294)

My invention relates to electro-responsive systems adapted to control the operation of electric circuits and apparatus in accordance with the electrical conditions of other electric circuits such as portions of an electric generating, transmission, or distribution system.

More particularly, my invention relates to electric fault responsive or protective relay systems intended to control the operation of disconnecting means such as circuit breakers and the like in response to the occurrence of abnormal conditions on an electric power system.

Various electric protective relay systems have been proposed in the past intended to cause disconnection of sections of an electric power network on which faults may occur. Such systems, in order to achieve successful operation, must not only effect tripping of the circuit breakers, on the occurrence of a fault, by means of which the faulty section may be disconnected from the system, but must, with equal certainty, avoid the operation of circuit breakers controlling other sections, which have not suffered a fault, but which, as a result of a fault on some other portion of the power network, may be subjected to abnormal currents.

It has been found, more particularly in the case of systems of considerable extent, carrying very large amounts of power, that the occurrence of faults, and the resulting automatic operation of circuit breakers involving abrupt changes in load conditions, may give rise to conditions of instability, characterized by a tendency of synchronous apparatus to fall out of step and resulting in the pulsating flow of currents through portions of the network which have not suffered faults. Such currents, however, often attain magnitudes of the order of fault currents and may be accompanied by pulsating alternations in the direction of flow of power.

Difficulty has frequently been encountered in preventing the incorrect operation of protective relay systems when such conditions occur, although such systems will function correctly without difficulty so long as the power system remains in a condition of stability. One method of avoiding this difficulty, largely resorted to in the past, has been to provide the protective relays with such time delay features as will prevent their operation by reason of transient pulsations. It has more recently been appreciated, however, that delay in removing electrical faults from a power network is a major contributing cause to the occurrence of conditions of instability, and, at the present time, to an increasing extent, substantially instantaneous operation is demanded of a protective relay system.

It is, therefore, apparent that, in order to secure a completely effective relay system means must be found which will distinguish between currents directly resulting from faults, and currents, of similar magnitude, which are due to conditions of instability.

A distinguishing characteristic of fault currents, in comparison with effects due to instability, is that the former are, almost exclusively, either faults to ground, or faults between two phases. Excess currents arising from instability, on the other hand, more usually affect all three phases.

It has, therefore, been proposed to overcome the difficulty cited above by providing fault responsive relays adapted to distinguish between flow of current in an abnormal manner resulting from actual faults, or breakdown of insulation, and currents merely of abnormal magnitude caused by instability. Relays actuated in accordance with departure from normal conditions of balance, or symmetry of the electrical conditions in the respective phases of a three phase system, have been suggested to accomplish this result.

Conditions of instability usually result in heavy, balanced, three phase currents. Ground faults and faults between two phases result in pronounced out-of-balance effects. Balanced three phase faults are extremely rare. Faults between all three conductors of a transmission line undoubtedly occur sometimes. But, more often, the initial cause thereof is a ground or a fault between two phases, spreading, later, as a result of the power arc, to the third phase and, if the fault be promptly disconnected in its initial condition, by fast operating relays actuated by the out-of-balance effect, the three phase fault condition will not be reached. A completely balanced three phase fault may, of course, result from a switching mistake. This occurrence, however, can readily be prevented by suitable interlocking of switchgear, which procedure is to be preferred to the provision of relays for dealing with the fault after it has occurred.

According to the theory of symmetrical components, relays which operate on the principle of phase unbalance are said to be actuated in accordance with the negative phase sequence component of the fault currents.

Two classes of apparatus have been available for furnishing operation in accordance with the extent to which lack of balance may exist between the three phases. First, there have been various types of electro-mechanical devices or relays which are actuated by the sum or difference of a plurality of electro-magnetic forces produced by the three phase currents. Second, there have been arrangements of capacity, reactance, and resistance, in the form of networks designed to produce phase shift effects by means of which a resultant alternating current electrical output is provided which may be related to one of the symmetrical components of the three phase currents.

Apparatus of the former type is limited in its application by the fact that, by its inherent nature, its function can only be carried out through the agency of mechanical movement. It is, therefore, limited to the closing of contacts and cannot provide an electrical effect dependent upon the magnitude of the out of balance effect. Furthermore, modern requirements, in connection with relay systems for important power networks, demand the maximum possible speed of operation of the protective relay devices. The presence of moving parts, possessing inertia and elasticity, and which must be displaced through a certain distance in order to actuate contact making means, sets certain definite limits to the maximum speed of action at which certainty of correct operation and freedom of incorrect action is attainable.

Apparatus of the second class has certain disadvantages which have precluded the extensive application of symmetrical component networks to electric protective relay systems. Relay devices in general are energized from current transformers, usually of the bushing transformer type. The power available in the secondary circuit is, therefore, subject to limitations. A feature of the network arrangements used for furnishing energy to relays, in accordance with a symmetrical component, is that they are wasteful of power by reason of the essential use of resistance elements carrying an appreciable portion of the total power available in order to produce the phase shift which is necessary. The voltampere burden imposed upon the current transformer is therefore excessive.

The output must be small in relation to the power spent in the network if the latter is to be accurate in its operation, thus the power available for relay operation is severely restricted. The effect of these circumstances is that fault currents of considerable magnitude are necessary in order to operate the relay device. In addition, the relative values of the resistance, capacity and reactance elements in the network are critical. In order to produce the proper phase shift effect, accuracy is required of the order associated with resonant circuits. It is difficult to furnish reactances and resistances, that will not undergo some change in value over the wide range of current magnitude embraced by fault currents, which are not unduly costly. Moreover, such networks impose unbalanced loads upon the current and potential transformers.

It is an object of my invention, therefore, to provide an improved electro-responsive system of the type actuated by unbalance between the phases of a polyphase system which may be carried into effect without any moving apparatus or parts and which, in consequence, is especially advantageous for effecting high speed actuation of circuit disconnecting means.

It is a further object of my invention to provide an electric protective arrangement which shall not be dependent for its correct action upon exact phase relation effects requiring critical values for the various circuit constants and which shall be simple, economical, shall make efficient use of the power furnished from the current transformer, shall not impose a high burden upon the current transformer, and shall be capable of correct operation at more than one frequency.

It is a further object of my invention to provide a phase unbalance electro-responsive system particularly adapted instantaneously to control the operation of electron discharge devices, such as carrier current means for controlling remote control breakers and the like, or to directly control vapor electric current conducting or disconnecting means.

It is a still further object of my invention to provide an electro-responsive system which shall not be limited to the initiation of a control action, such as is represented by the closing of a relay contact, but which, in addition, shall be capable of furnishing an electrical effect related in magnitude to the phase unbalance effect and which, in consequence, is adapted to co-operate with other electro-responsive systems to control or modify the action thereof in accordance with the conditions of balance of the currents in the three phases.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1:
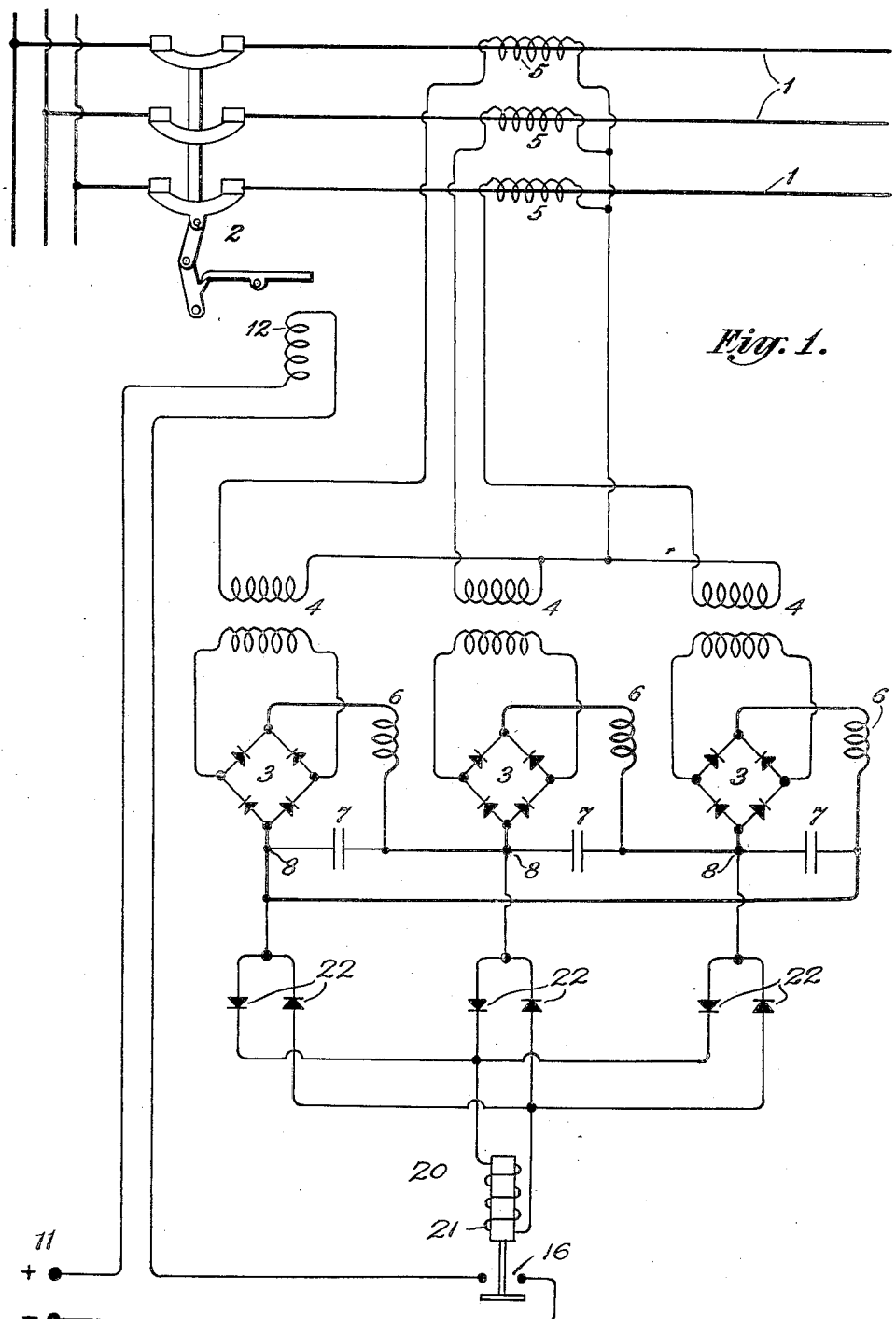
Fig. 1 is a diagrammatic view of a portion of a power network including an embodiment of my invention.

Referring now to the embodiment of my invention shown in Fig. 1, the conductors 1 of a three phase circuit are provided with a plurality of suitable circuit controlling means such as circuit interrupters 2. These interrupters are arranged to be controlled, according to my invention, by apparatus responsive to lack of balance between the three phase currents flowing in conductors 1.

The apparatus for accomplishing this result consists of rectifying means 3 which may be of the contact, copper oxide, vapor electric, electron emission, or other suitable type, energized through transformers 4 from current transformers 5 associated with the conductors 1.

While I have shown the transformers 4 and current transformers 5 connected in star, it will be apparent to those skilled in the art that either or both may be connected on delta. It will be further apparent that, in some cases, the transformers 4 may be omitted but that, in other cases, it may be necessary to employ these transformers or it may be desirable if the most economical current and voltage rating of rectifiers 3 does not correspond with the standard current transformer secondary rating.

The direct current output circuits of the rectifying means 3 are furnished with suitable filtering means such as reactors 6, condensers 7 or both as may be most economical according to the voltage at which the rectifiers 3 operate. The direct current output circuits of the rectifying means 3 are connected, as shown in the figure, in series, so as to form a closed circuit, the direction of the rectified voltages being cumulative within this closed circuit.

If now it be assumed that a balanced three-phase load flow in the conductors 1 the currents flowing in the primary windings of the transformers 4, though displaced in phase symmetrically according to normal conditions in a three phase circuit, will be equal in magnitude. Similarly, the secondary currents of the transformers 4 and, therefore, also the alternating current input to the rectifying means 3, will be equivalent. Thus the direct current outputs of the rectifying means 3 will also be equal.

The phase difference between the primary currents will not produce any apparent effect in the direct current circuit if adequate filtering means are used so that the ripple in the rectified current is reduced to a reasonably low value.

There will, therefore, circulate in the direct current closed circuit formed by the rectifiers 3 and the reactors 6 a direct current corresponding to the value of the three phase balanced currents flowing in the conductors 1. Under these circumstances the points 8 at which each rectifier is connected to the adjacent reactor, will all be at the same potential. Between these equipotential points 8 I connect a relay 20 having an operating coil 21, through six rectifying means 22, as shown in the figure. It will be obvious on referring to the figure that with this arrangement no path exists between any point 8 and either of the other points 8, except by way of the relay coil 21, and that all such currents as may be set up when, on account of unbalanced phase currents the points 8 are no longer at equal potential, flow in the same direction through the relay coil. The relay 20 has a contact 16 connected to complete a circuit from a source 11 to the trip coil 12 of the circuit breaker 2.

The filtering means may, if desired, be placed between the equipotential points 8 and the rectifying means 22 as well as, or instead of, where shown in the diagram.

The relay 20 may be of very simple construction, being operated by direct current. Under all conditions when the three phase currents in the conductors 1 remain balanced the points 8 will be at equal potential and no current will flow in the relay 20 which will remain inoperative.

Let it now be assumed that, by reason of some abnormal occurrence, such as a ground or a between phase fault on the power system, the currents in the conductors 1 become unbalanced. The alternating currents delivered to the rectifiers 3 will no longer be equal and, in consequence, the point 8 will not now be at the same potential. Difference current will now tend to flow in the rectifying means 22 and relay 20 due to the fact that any current flowing in a rectifier 3 in excess of the current set up therein by its alternating current input will encounter a voltage drop due to the resistance of the said rectifier 3. Thus, the relay 20 will close the contact 16 and thereby cause operation of the circuit breaker.

An important feature of this arrangement is that, since it provides a single electric current dependent upon the out-of-balance effect, whereby a single circuit relay may be actuated in accordance therewith, any control device operable by a single electrical effect may be controlled by this electro-responsive system. For example, the direct current output from the rectifiers 22 might be connected directly to the circuit-breaker trip coil 12, if desired, thus eliminating the time taken to close the relay contacts and energizing the winding 12 substantially simultaneously with the occurrence of the fault effect of which the unbalancing of the currents in the conductors 1 is a result.

Figure 2:
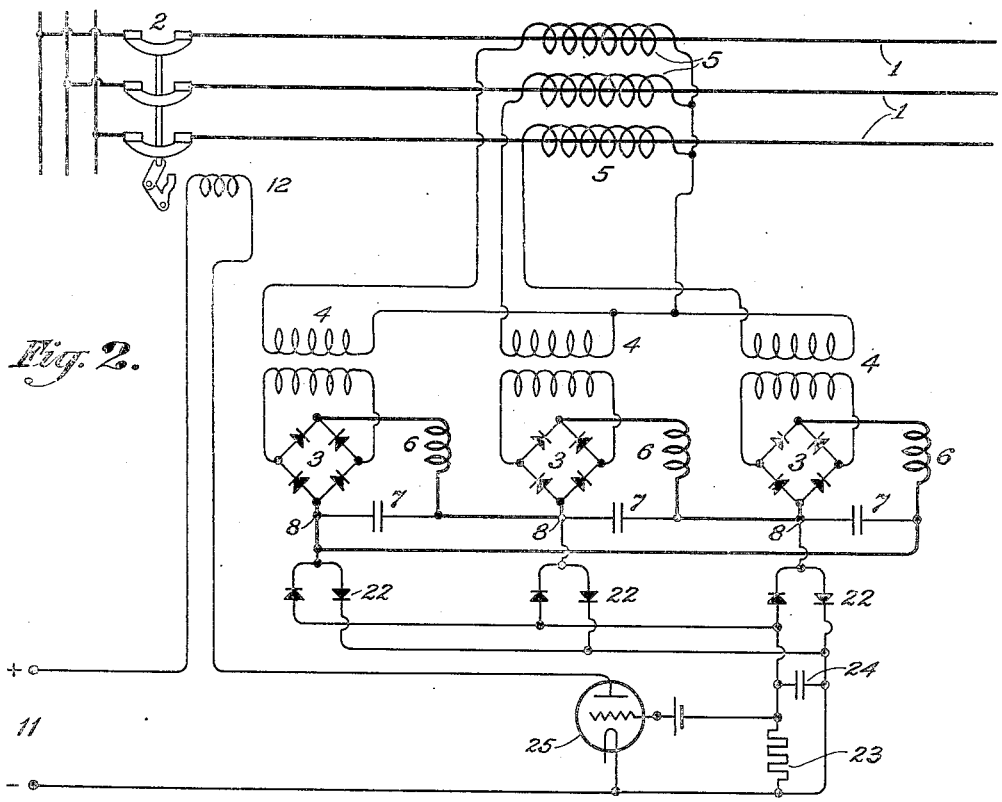
Fig. 2 is a diagrammatic view, analogous to Fig. 1, illustrating an embodiment of my invention especially adapted to control an electric discharge device.

Similarly, this arrangement is particularly adapted to control the operation of electron discharge devices of the type in which the current flowing between anode and cathode may be controlled by a small amount of power applied to a control electrode such as a grid. Fig. 2 shows a modification of my invention adapted to control an electron discharge device of the type in which control is provided in accordance with the magnitude of the voltage applied to the grid.

In Fig. 2 the arrangement of power circuit, rectifying means, and closed direct current circuit, having equipotential points 8 is shown precisely the same as in Fig. 1. The operation of this portion of the circuit is precisely in accordance with the description above in reference to Fig. 1. However, in Fig. 2 I have shown the circuit breaker 2, instead of being arranged to be tripped by energization of a trip coil 12, as being retained in the closed position by continuous energization of the coil 12 and adapted to be tripped by interrupting the current in the said coil. The arrangement shown in Fig. 2 is one particularly suitable for provding very high speed relay action since by employing it more rapid action of the circuit breaker is obtained through avoiding the more usual un-latching system.

In the modification illustrated in Fig. 2 I connect between the equipotential points 8 a plurality of rectifiers 22 in the manner described with reference to Fig. 1. In place of the relay coil, however, I provide a resistance 23 connected to receive the output current of the rectifiers 22.

I may connect a condenser 24 in parallel with a resistor 23. Thus when the currents in the conductors 1 are balanced no current will flow in the resistor 23 and no voltage drop will exist thereacross. When the three phase power currents are unbalanced by a fault, current will flow in the resistor 23. This current will always be in the same direction for any condition of unbalance, whether it be a ground fault unbalancing one phase only or whether it be a fault between phases which unbalances two or more phases, and independent of which of the phases are affected. Thus, under unbalance fault conditions a current will flow in the resistor 23 which will set up a voltage drop across the resistance. This voltage will always be of the same polarity, namely, as shown in the diagram the upper end of the resistor 23 will assume a negative potential relative to the lower extremity.

An electron discharge device 25 is connected in series with the source 11 and the retaining coil 12 of the circuit breaker. The cathode of the device 25 is connected to the lower terminal of the resistor 23 and the control electrode is connected, through positive biasing means, to the upper end of the said resistor. Thus, under normal conditions, when the power circuit is carrying balanced load currents, no voltage drop will be present across the resistor 23 and the grid of the device 25, being biased positively, current will flow from anode to cathode thereof energizing the coil 12 and retaining the circuit breaker 2 in the closed position. But when a fault occurs, causing phase unbalance, the resulting voltage drop across the resistor 23 applies a negative voltage to the grid of the tube 24. This decreases the current in the retaining coil 12 thus allowing the circuit breaker to open.

According to this arrangement the commencement of the opening movement of the breaker 2 will be substantially simultaneous with the occurrence of the fault.

It will, of course, be apparent to those skilled in the art that the electron discharge device 25 may be arranged to operate a trip coil of the more usual form by applying a negative biasing potential to the grid thereof and by so reversing the connections of the rectifiers 22 to the resistor 23 that when current flows in the said resistor a positive voltage will be applied to the grid to cause current to flow through the trip coil when the fault occurs.

Figure 3:
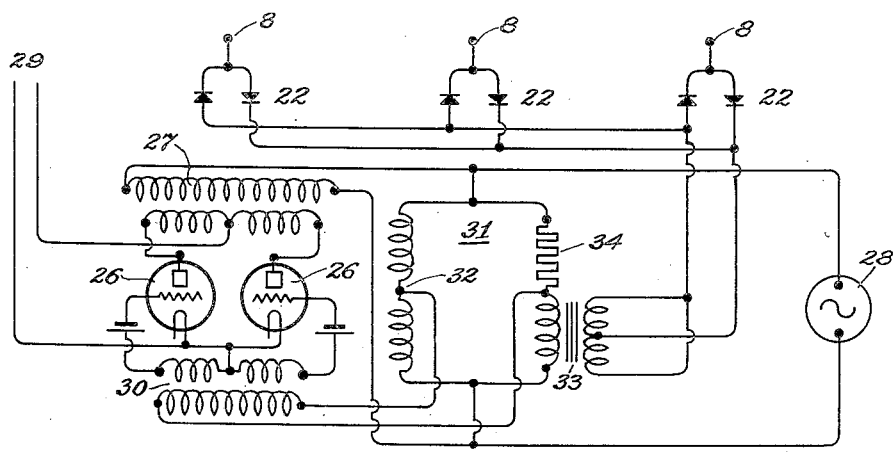
Fig. 3 is a view of a further modification of the system shown in Fig. 2.

In Fig. 3 I show a modification of my invention according to Fig. 2 adapted to control an electron discharge device of the type in which control of the current flowing between anode and cathode, when connected to an alternating current source, is accomplished by means of phase shift between the alternating voltage applied to the control electrode and the anode voltage.

In the system shown in Fig. 3 a pair of electron discharge devices 26, which may be of the vapor electric discharge type, are energized through a transformer 27 from an alternating current source 28. Rectified current flowing through the electron discharge devices 26 is conducted by leads 29 to such load circuit, control device or the like as may be desired, which device is not shown in the figure. Control of the current supplied through the conductors 29 to the said load circuit is provided by applying to the grids of the devices 26 an alternating voltage obtained through a grid transformer 30 from a phase shift network 31 also energized by the source 28. The network 31 comprises a mid-tapped reactor or auto-transformer 32, a saturating reactor 33 and a resistor 34. The phase shift network 31 is adapted to furnish to the grid transformer 30 an alternating voltage the phase of which, in relation to that of the voltage of the source 28, which energizes the anode circuits of the devices 26, is caused to be varied in accordance with the direct current supplied to the saturating winding of the reactor 33, thereby controlling the average value of the rectified current furnished by the said devices. Saturating current is furnished to the reactor 33 from the rectifiers 22 connected to the equipotential points 8 which are connected to the arrangement of rectifiers and direct current closed circuit precisely as shown in Fig. 1 and therefore not repeated in Fig. 3.

Accordingly, in the modification shown in Fig. 3, when the three phase currents in the conductors 1 are balanced no saturating current flows in the reactor 33. Under this condition the network 31 may be so arranged that the electron discharge devices 26 conduct fully, supplying current to the load circuit through leads 29. But when a fault occurs, causing out-of-balance currents to flow in the power circuit, difference voltages are set up between the points 8 and difference currents tend to flow therebetween. By reason of the action of the rectifiers 22 these difference currents are caused to flow, in one direction only, through the saturating winding of the reactor 33. This causes a shift in the phase of the grid voltage applied from the transformer 30 and reduces or interrupts the current supplied by the electron discharge devices 26.

While I have shown this arrangement by way of example it will be apparent to those skilled in the art that many other useful applications falling within the spirit of this invention may be provided in which the direct current furnished by the rectifiers 22 may be arranged to provide electric or electro-mechanical control action.

As a further illustration the electron discharge devices 26 may be of large power rating and three pairs thereof, connected for alternating current output, may take the place of the circuit breaker 2 shown in Fig. 2. The current flowing in the conductors 1 may then be interrupted or controlled, in response to out-of-balance conditions, by entirely electrical means, three reactors 33 being energized by the direct current provided by the rectifiers 22.

Figure 4:
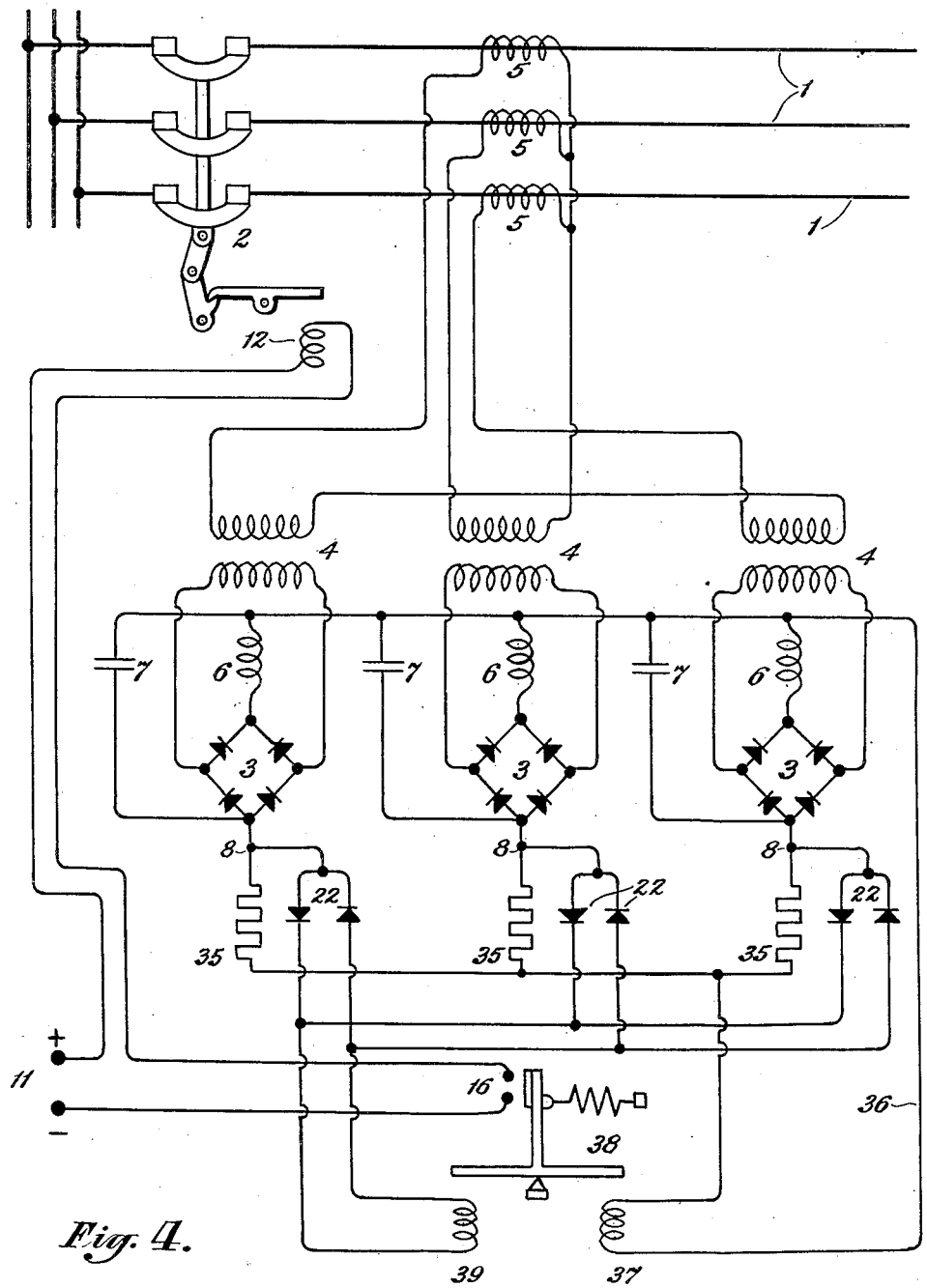
Fig. 4 shows a modified form of my invention adapted to operate in accordance with the percentage out-of-balance of a power network.

A further modification of my invention is shown in Fig. 4. In Fig. 1 the equipotential points 8 were obtained by connecting the direct current circuits of the rectifying means 3 in series to form a closed circuit. In Fig. 4 I show a different method of so balancing the outputs of the three rectifying means 3 as to provide difference energy in the event of inequality between the three direct current outputs.

In Fig. 4 the circuit breaker 2, the trip coil 12, the transformers and current transformers 4 and 5 are all as shown in Fig. 1. The rectifying means 3, however, together with reactors 6 in series therewith, are connected in series with resistors 35 of like value. As shown in the diagram the three circuits, each comprising a reactor 6, rectifier 3, and resistor 35, are end connected, in parallel, to a conductor 36 which forms a common return path between the extremities of the reactors 6 and the resistors 35. A winding 37 of a relay 38 is included in this return path.

It will be apparent that if the three phase currents are balanced the direct current outputs of the rectifying means 3 will be equal. Thus if the currents flowing in the resistors 35 are equal the points 8 are again at equal potential as described in connection with Fig. 1. But if the three phase currents are not balanced the direct currents flowing in the rectifiers 3 and the resistors 35 will be unequal and difference of potential will exist between the points 8. I, therefore, connect the rectifiers 22 between the points 8 exactly as shown in Figs. 1, 2 and 3. It will be apparent to those skilled in the art that any of the circuits or devices arranged to be connected to the equipotential points 8 through the rectifiers 22 in any of the other figures may be used with the arrangement of parallel connected rectifiers as shown in Fig. 4 as well as with the series arrangement of rectifiers 3 and reactors 6 shown in Fig. 1.

An advantage of the modification of my invention shown in Fig. 4 is that it is possible to connect electro-responsive devices in the common return path between the reactors 6 and the resistors 35. This return circuit carries the sum of the direct current outputs of the rectifying means 3 and this total direct current is proportional to the mean three phase currents flowing in the conductors 1. I, therefore, provide the relay 38 of differential type having a coil 39 tending, when energized, to close the contact 16 and the second coil 37 tending to restrain the relay from closing the contact. The coil 39 I connect to receive the current furnished by the rectifiers 22. Thus this latter coil is energized in proportion to the amount of unbalance of the three phase currents in the conductors 1. Since the coil 37 is connected in the common return circuit, as shown, it carries a current proportional to the mean value of the three alternating currents in the conductors 1. Thus the relay tends to operate in accordance with the ratio of the unbalance effect to the total current and is, accordingly, responsive to the per cent out-of-balance of the three phase currents.

It will be apparent to those skilled in the art that I may provide a plurality of contacts (not shown) on the relay which operate when the relay is actuated in the reverse direction, that is, in the direction in which it tends to be operated by the excitation of the coil 37. The relay will then be responsive to the difference between the total current and the unbalance current and its action will be controlled in a similar manner to relays operative in response to the positive phase sequence component.

It will further be apparent to those skilled in the art that the use of the balance means shown, involving a restraining element excited in accordance with the total current, renders possible elimination, in part, of the filtering means. Any excitation of rectifiers 22 due to ripple will be proportional to the total load, and thus may be compensated for by the effect of the coil 37.

While I have shown the relay 38 in the form of a mechanically balanced relay by way of illustration, it is to be understood that other differential devices may be used in accordance with the spirit of my invention, as, for example, differential arrangements of electron discharge devices, which may include a phase shift network adapted to provide phase displacement in one direction in response to the magnitude of one direct current, which may be the current shown as flowing in coil 39, and arranged differentially to tend to displace the phase in the opposite direction, in response to a second direct current, which may be the current which, in Fig. 4 I show as flowing in coil 37. The resultant phase shift depends upon the difference between these two direct currents and thus may control vapor electric discharge devices after the same manner as the relay 38.

While I have shown in the foregoing figures arrangements of three rectifiers each associated with one phase of a three phase circuit it will be apparent to those skilled in the art that I may, without departing from the spirit of my invention, employ other arrangements for so exciting two or more rectifiers by various combinations of the three phase currents as to produce equal excitation of the rectifiers under balanced conditions and unequal effects when the three phase circuits are unbalanced. Many such schemes are well known to the art such as, for example, exciting one element in accordance with the combination of currents in two phases and the other element in accordance with the current in the third phase, or by balancing a combination of the currents in phases one and two with a combination of the currents in the second and third phase.

In the foregoing diagrams and specification I have shown and described means responsive to the out-of-balance of a three phase circuit whereby a circuit breaker or other electrically operated device may be actuated when a predetermined amount of phase unbalancing exists. I have pointed out in the preliminary description of this invention how excess currents due to system instability may be distinguished from fault currents on account of the fact that the former are usually balanced three phase currents whereas the latter are almost invariably accompanied by a certain amount of out-of-balance effect.

The presence of unbalanced currents flowing in any given portion of a power network such as a transmission line, is not, however, an indication that the said transmission line is itself subject to an electrical fault, nor is it an indication that the transmission line should be disconnected. The line may be carrying out-of-balance currents flowing towards a fault on some other portion of the power system, and it should be held in service, the fault being eliminated from the system by the action of circuit breakers controlling the part of the power network in which the trouble has occurred.

Many different relay systems have been devised for the purpose of discriminating under these conditions, so that only the faulty line may be disconnected, and other portions of the network be free from interruption. These operate according to several well-known principles such as parallel line current balance, power directional relays, distance or impedance relays, and means for effecting the disconnection or the retention of a transmission line in accordance with the relation between the power conditions at the two extremities of the line, carrier current or like means being provided for effecting comparison between the conditions at the two ends to effect disconnection of the line only if the line itself has suffered a fault.

All of these systems, unless restricted to ground faults only, if they are effective for faults between any two phases, are likewise affected by three phase currents. Thus they are subject to energization by all excess currents which may flow, in the portion of the power system embraced by the protective relay system, due to transient instability of synchronous machinery connected to the power system. As I have indicated in the foregoing description, this element of disturbance adds very greatly to the difficulty of securing one hundred per cent successful relaying on a power system. Many of the existing relay systems would discriminate with greater precision and would operate with much greater success if they might be relieved therefrom. That is, if they be made responsive to all faults between two phases only, or to unbalanced three phase faults, but not responsive to balanced three phase currents; or responsive to the latter to a reduced extent. In some instances means have not been known, in the past by which this operating feature may be incorporated in the design or construction of the relays. In other cases it has not been convenient to introduce additional features into the relay structure to achieve this result.

Figure 5:
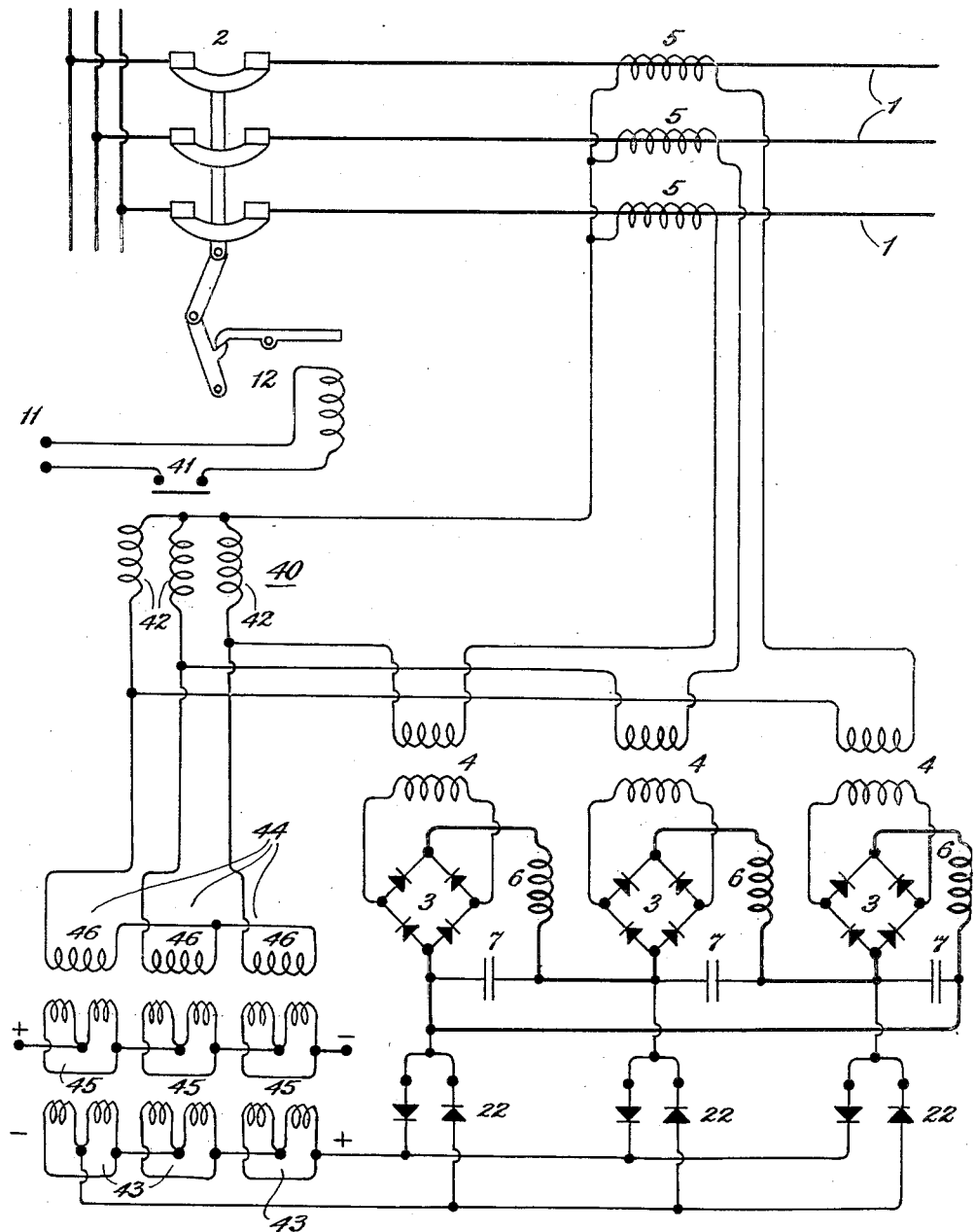
Fig. 5 is a view illustrating a further modification of my invention adapted to control the energization of other electro-responsive apparatus in accordance with phase unbalance.

According to a modification of my invention shown in Fig. 5 I provide apparatus, free from moving parts, which may be used in conjunction with any known or existing selective relay system responsive to all forms of faults between phases, without any structural change or other modification of the said system, by means of which the energization of the relays may be permitted only on the occurrence of faults giving rise to out-of-balance effects, and may be prevented in the case of excess currents which are balanced in the three phases; or may be permitted, in the latter case, at reduced intensity. It is understood that any such relay arrangement may, in addition, be operative in the case of ground faults and that the additional feature represented by my invention as shown in Fig. 5 will have no effect thereon since ground fault relays or systems are not as a rule affected by three phase or other interphase effects.

In Fig. 5 I show conductors 1, a circuit breaker 2 having a trip coil 12 supplied from the source 11 all as described in the previous figures. Any existing type of relay or protective system is represented by a device 40 having contacts 41 and interphase protection windings 42. It may also have a ground protection element, omitted in the diagram. The device 40 may represent, for example, a power directional relay, a distance relay, or a carrier current system such as is described in Patent No. 1,797,976. Only essential current windings are indicated and all potential windings and other auxiliary or detail circuits or apparatus are omitted.

The windings 42 are energized from the current transformers 5 as shown in the diagram. Included in the connection to the windings 42 are the primary windings of the transformers 4 which energize the rectifying means 3 and the reactors 6, all as already shown and described in reference to Fig. 1.

Between the equipotential points 8 I connect the rectifiers 22, as described in Figs. 1 and 2.

The unidirectional current derived from the rectifiers 22, only when out-of-balance conditions exist, and which is not present when the three phase circuit is balanced is led to the saturating windings 43 of three saturating reactors 44 having additional bucking saturating windings 45 and alternating current reactance windings 46. The windings 46 are connected in parallel with the windings 42 of the protective device 40 to divert current therefrom in accordance with the respective impedances of the relay windings 42 and the reactance windings 46. These latter windings are so proportioned that, when the core of the reactors 44 is saturated, all of the current supplied from current transformers 5, or if preferred a suitable proportion thereof, is diverted from windings 42. But when the cores of the reactors are not saturated, substantially all of the current from the transformers 5 flows in the windings 42.

The bucking saturating windings 45 are continuously excited from a suitable direct current source (not shown) and are so connected as to oppose the action of the saturating windings 43 so that the cores of the reactors are magnetized in accordance with the difference between the effects of windings 43 and 45. Thus, when the current in the windings 43 increases the impedance of the windings 46 decreases, and vice versa.

When the three phase power current is balanced no current is delivered by the rectifying system to the reactor windings 43. The reactors, therefore, are saturated and divert current from the windings 42 of the protective device 40 so that the latter is not effective under this condition or is reduced in sensitivity. But when a fault occurs causing an out-of-balance condition, current flows in the windings 43 neutralizing the current in the windings 45. The reactor is then not saturated and no appreciable current is diverted from the windings 42 which operates substantially as if the out-of-balance control element and the reactors 44 were absent.

It will be apparent to those skilled in the art that various other means of providing inverse action of the reactor 44, instead of using the bucking winding 45 may be employed. For example, the reactor may be provided with a single saturating winding energized from an electron discharge device connected and operating precisely in the manner of the device 25 in Fig. 2.

Although I have chosen certain specific embodiments of my invention for illustration, many modifications thereof are possible and will be apparent to those skilled in the art to which it pertains. My invention, therefore, is not to be limited except insofar as is necessitated by the prior art and by the spirit of the appended claims.

I claim:

1. In combination with a polyphase circuit, means responsive to an unbalanced current condition on the phases of said circuit comprising a single electro-responsive device, and means for energizing said device in accordance with the unbalance between rectified currents derived from said circuit respectively proportional to the phase currents thereof.

2. In combination with a polyphase circuit, means responsive to an unbalanced condition of the phases of said circuit, comprising a single circuit element, and means for energizing said circuit element in accordance with the unbalance between rectified currents derived from said circuit respectively proportional to any phase currents thereof.

3. In combination with a polyphase circuit, means for deriving rectified currents therefrom respectively proportional to the phase currents of the circuit, and a single circuit element energized in accordance with the algebraic sum of the said rectified currents.

4. In a polyphase circuit, means for deriving rectified currents therefrom respectively proportional to the phase currents of the circuit and further rectifying means for providing a single electric current proportional to the algebraic sum of the said rectified currents.

5. In a polyphase circuit, means for deriving rectified currents therefrom respectively proportional to the phase currents of the circuit and further rectifying means for providing a single unidirectional electrical effect proportional to the difference between the magnitudes of the said rectified currents.

6. An electro-responsive system for a polyphase electric circuit, including rectifying means energized by currents in the several phases of the said electric circuit, and a single means responsive to inequality of the direct current outputs of the said rectifying means to effect a circuit controlling action when a condition of unbalance between any of the phases of the polyphase electric circuit occurs.

7. In an electro-responsive system for a polyphase electric circuit, a plurality of rectifying means, each energized in accordance with the currents in the several phases of the said circuit, filtering means therefor, means responsive to inequality of the direct current outputs of the said rectifying means, including further rectifying means for unidirectionally energizing a single electric circuit element in accordance with the sum of the differences between the outputs of the first mentioned rectifying means, regardless of the polarity of the said differences, said electric circuit element effecting an electric circuit controlling action in accordance with an unbalanced condition of the currents in the phases of the said polyphase electric circuit.

8. In combination with a polyphase circuit, means responsive to an unbalanced current condition of the phases of said circuit comprising a plurality of rectifiers for furnishing rectified currents respectively proportional to the phase currents of said circuit, a circuit including said rectifiers in which, only when the phase currents are balanced, a plurality of equi-potential points are set up, further rectifying means connected to said equi-potential points, a single circuit element energized from said equi-potential points through said further rectifying means, and means actuated in accordance with the energization of said single circuit element for exercising a controlling effect on said polyphase circuit.

9. In an electrical system, a plurality of alternating current sources of variable magnitude, means for deriving rectified currents therefrom respectively proportional thereto, and further rectifying means for providing a single uni-directional electrical effect proportional to the sum of the differences between the magnitudes of said rectified currents.

10. In an electrical system, a plurality of alternating current sources of variable magnitude, a plurality of rectifiers for furnishing rectified currents respectively proportional thereto, a circuit including said rectifiers in which, only when said alternating current sources are all of equal magnitude, a plurality of equi-potential points are set up, and further rectifiers energized in accordance with the voltage between said equi-potential points for providing a single uni-directional electrical effect proportional to the sum of the differences between the magnitudes of said rectified currents.

11. In an electro-responsive system, a plurality of direct current sources, and rectifying means energized in accordance with the difference between the voltages of the said sources, to energize a single electric circuit element in accordance with the sum of the said difference voltages regardless of the polarity of the said difference voltages.

12. In an electrical system, a plurality of direct current sources of variable magnitude, said sources being included in a closed circuit in which, only when said sources are all of equal magnitude, a plurality of equi-potential points are set up, and rectifying means energized in accordance with the voltage between said equi-potential points for providing a single uni-directional electrical effect proportional to the sum of the differences between the magnitudes of said sources.

13. An electro-responsive system for a polyphase electric circuit, including rectifying means energized by currents in the several phases of the said electric circuit, all of the direct current output circuits of said rectifying means being connected cumulatively in series to form a closed circulating current circuit, and means connected between normally equi-potential points in said closed circuit to effect a circuit controlling action in response to departure from the equi-potential condition of said points, when a condition of unbalance between any of the phases of said polyphase electric circuit occurs.

14. In combination with a polyphase circuit, means responsive to an unbalanced current condition of the phases of said circuit, comprising a space discharge device, and means for energizing said space discharge device in accordance with the unbalance between rectified currents derived from said circuit respectively proportional to the phase currents thereof.

15. In combination with a polyphase circuit, means responsive to an unbalanced current condition of the phases of said circuit, comprising a vapor-electric device, and means for energizing said vapor-electric device in accordance with the unbalance between rectified currents derived from said circuit respectively proportional to the phase currents thereof.

16. An electro-responsive system for a polyphase electric power circuit, including a plurality of rectifying means, each adapted to be energized in accordance with the currents in the several phases of the said power circuit, filtering means therefor, further rectifying means for uni-directionally energizing phase shifting means in accordance with the sum of the differences between the outputs of the first mentioned rectifying means, and a space-current device controlled by said phase shifting means to effect an electric circuit controlling action in accordance with an unbalanced condition of the polyphase electric power circuit.

17. An electric protective fault responsive system for a polyphase power circuit, including rectifying means adapted to be energized in accordance with the occurrence of an abnormal condition on the electric power circuit, circuit-disconnecting means, an electron discharge device normally carrying a current retaining in the closed position said power circuit disconnecting means, and means whereby said electron discharge device is controlled by said rectifying means, on the occurrence of said abnormal condition, to terminate the retaining current and to release the circuit disconnecting means, to interrupt the current in the power circuit, the commencement of the action of said disconnecting means being simultaneous with the occurrence of the abnormal condition.

18. An electro-responsive system for a polyphase electric circuit, including rectifying means excited by currents in the several phases of the said electric circuit, each direct current output circuit of said rectifying means being connected in series with a resistance, said output circuits and resistances being end connected in parallel, and means connected between normally equi-potential points to effect a circuit controlling action in response to departure from the equi-potential condition of the said points.

19. An electro-responsive system for a polyphase electric circuit, including rectifying means excited by currents in the several phases of the said electric circuit, each of the direct current output circuits of the said rectifying means being connected in series with a resistance, said output circuits and resistances being end connected in parallel, means connected between equipotential points, and means energized in accordance with the sum of the outputs of the rectifying means, jointly to effect a circuit controlling action in accordance with departure from the equi-potential condition of the said points and the sum of the outputs of the rectifying means.

20. In an electrical system, a plurality of alternating current sources of variable magnitude, means for deriving rectified currents therefrom respectively proportional thereto, and further rectifying means for providing a single uni-directional electrical effect proportional to the arithmetical sum of the differences between the magnitudes of said rectified currents, together with an electro-responsive device jointly controlled by said uni-directional electrical effect and in accordance with the arithmetical sum of the magnitudes of said sources, so as to be actuated in accordance with the mean percentage variation of said sources.

21. In an electrical system, a plurality of alternating current sources of variable magnitude, a plurality of rectifiers for furnishing rectified currents respectively proportional thereto, a circuit including said rectifiers in which, only when said alternating current sources are all of equal magnitude, a plurality of equi-potential points are set up, and further rectifiers energized in accordance with the voltage between said equi-potential points for providing a single uni-directional electrical effect proportional to the arithmetical sum of the differences between the magnitudes of said rectified currents, together with an electro-responsive device jointly controlled by said uni-directional electrical effect and in accordance with the arithmetical sum of the magnitudes of said sources, so as to be actuated in accordance with the mean percentage variation of said sources.

22. In an electrical system, a plurality of direct current sources of variable magnitude, said sources being included in a closed circuit in which, only when said sources are all of equal magnitudes a plurality of equi-potential points are set up, and rectifying means energized in accordance with the voltage between said equi-potential points, for providing a single uni-directional electrical effect proportional to the arithmetical sum of the differences between the magnitudes of said sources, together with an electro-responsive device jointly controlled by said uni-directional electrical effect and in accordance with the arithmetical sum of the magnitudes of said sources, so as to be actuated in accordance with the mean percentage variation of said sources.

23. In combination with a polyphase circuit, means responsive to an unbalanced current condition of the phases of said circuit, comprising a saturable core device, and means for energizing said saturable core device in accordance with the unbalance between rectified currents derived from said circuit respectively proportional to the phase currents thereof.

24. In combination with a polyphase electric circuit, a known electric protective system responsive to inter-phase fault currents on said circuit, and an electro-responsive system including rectifying means energized by currents in the several phases of said electric circuit, and a single means responsive to inequality of the direct current outputs of the said rectifying means, for modifying the operation of the protective system so as to cause it to respond in a different manner, selectively, to polyphase balanced currents, and to fault currents characterized by phase unbalance effects.

25. In combination with a polyphase circuit, a known electric protective system responsive to inter-phase fault currents on said circuit, and means responsive to an unbalanced current condition of the phases of said circuit, comprising variably conducting means and means for controlling said variably conducting means in accordance with the unbalance between rectified currents derived from said circuit respectively proportional to the phase currents thereof, for modifying the operation of the protective system so as to cause it to respond in a different manner, selectively, to polyphase balanced currents, and to fault currents characterized by phase unbalance effects.

26. In combination with a polyphase circuit, a known electric protective system responsive to inter-phase fault currents on said circuit, and means responsive to an unbalanced current condition on the phases of said circuit, comprising variable impedance means and means for controlling said variable impedance means in accordance with the unbalance between rectified currents derived from said circuit respectively proportional to the phase currents thereof, for modifying the operation of the protective system so as to cause it to respond in a different manner, selectively, to polyphase balanced currents, and to fault currents characterized by phase unbalance effects.

27. In combination with a polyphase circuit, a known electric protective system responsive to inter-phase fault currents on said circuit, and means responsive to an unbalanced current condition of the phases of said circuit, comprising saturable core means and means for energizing said saturable core means in accordance with the unbalance between rectified currents derived from said circuit respectively proportional to the phase currents thereof, for modifying the operation of the protective system so as to cause it to respond in a different manner, selectively, to polyphase balanced currents, and to fault currents characterized by phase unbalance effects.

28. In combination, a known electric protective system responsive to interphase fault currents on a polyphase power circuit, and means, including rectifying means, for modifying the operation of the protective system so as to cause it to respond in a different manner, selectively, to polyphase balanced currents, and to fault currents characterized by phase unbalance effects.

29. In combination, a known electric protective system responsive to interphase faults on a polyphase power circuit, and means for modifying the operation of the protective system, including a plurality of rectifying means each energized in accordance with the currents in the several phases of the said power circuit, filtering means therefor, and further rectifying means for unidirectionally energizing, in accordance with the sum of the differences of the outputs of the first mentioned rectifying means, modifying means to cause the protective system to respond in a different manner, selectively, to three phase balanced faults and to fault currents characterized by phase unbalance effects.

30. In combination, a known electric protective system responsive to interphase fault currents on a polyphase power circuit, a plurality of saturable means having reactance windings connected in parallel with the windings energizing the protective system, saturating windings for controlling the reactance of the saturable means, rectifying means furnishing a unidirectional current on the occurrence of phase unbalance conditions on the power system, and means controlled inversely by the said unidirectional current to increase the saturating effect when the unidirectional current decreases and to decrease the saturating current when the unidirectional current increases to control the energization of the windings of the protective system so that the said system responds in a lesser degree to balanced polyphase currents and in a greater degree to unbalanced currents.

ALAN S. FITZ GERALD.